United States Patent [19]

Lovasz et al.

[11] 4,212,545

[45] Jul. 15, 1980

[54] METHOD FOR CONTINUOUSLY PROCESSING TWO-COMPONENT PAINTS

[75] Inventors: Csaba Lovasz; Horst-Dieter Maab, both of Stuttgart; Horst Schene, Sindelfingen; Volker Teubner, Stuttgart, all of Fed. Rep. of Germany

[73] Assignee: Daimler-Benz Aktiengesellschaft, Fed. Rep. of Germany

[21] Appl. No.: 865,728

[22] Filed: Dec. 29, 1977

[30] Foreign Application Priority Data

Dec. 29, 1976 [DE] Fed. Rep. of Germany ....... 2659273

[51] Int. Cl.$^2$ ............................................. G05D 11/02
[52] U.S. Cl. .................................. 366/152; 324/61 R; 324/65 P; 366/132; 366/160; 366/177
[58] Field of Search ............... 366/132, 152, 160–162, 366/177, 348, 349, 605; 260/75 NE, 77.5 AA; 222/144.5, 145, 132; 324/61 R, 65 P

[56] References Cited

U.S. PATENT DOCUMENTS

| | | | |
|---|---|---|---|
| 2,757,334 | 7/1956 | Potter | 324/61 R |
| 2,772,393 | 11/1956 | Davis | 324/61 R |
| 2,794,171 | 5/1957 | Terry | 324/65 P |
| 2,836,792 | 5/1958 | Weber | 324/61 R |
| 3,267,418 | 8/1966 | Wolfe | 324/65 P |
| 3,425,667 | 2/1969 | Schutte et al. | 366/132 |

Primary Examiner—Harvey C. Hornsby
Assistant Examiner—Timothy F. Simone
Attorney, Agent, or Firm—Craig & Antonelli

[57] ABSTRACT

A method for producing two-component varnishes or paints involves withdrawing at least one colored basic varnish from a preselected source and introducing the varnish into a mixing zone, withdrawing a colorless hardener or cross-linking agent from another preselected source and introducing the hardener or cross-linking agent into said mixing zone, and maintaining a prescribed and previously adjusted mixing ratio between the varnish and the hardener or cross-linking agent by controlling the rate of flow of at least one component of the two-components, the basic varnish or the hardener or cross-linking agent, by a controllable metering means. The mixing ratio between the two components being determined by a means measuring a selected parameter of the mixture produced in the mixing zone. A suitable and measurable parameter of the mixture may be the electrical conductivity of the mixture, the dielectric constant of the mixture or the like.

7 Claims, 4 Drawing Figures

METHOD FOR CONTINUOUSLY PROCESSING TWO-COMPONENT PAINTS

The invention relates to a process or method for the continuous processing of two-component, commercially available varnishes or paints of differing color shades, discharged from a ring conduit system.

The utilization of two-component varnishes or paints on a large technical scale in paint shops or paint departments of, for example, automobile factories will become of greater significance in the future. This importance can be attributed primarily to an improved film quality. Besides, the use of two-component varnishes on a large technical scale is due to the fact that energy and expenses are reduced by this method. Moreover, one can expect a considerably lower burden on the environment by pollutants produced by the paint shops, as soon as the so-called high-solid-content two-component varnishes, presently being developed, are ready for use. These high-solids two-component varnishes are characterized by a proportion of organic solvents which is considerably reduced as compared to the conventional systems, so that the proportion of harmful organic compounds in the emissions caused by the paint shops is greatly lowered.

The two-component process is based on a polyaddition reaction of polyisocyanates with the hydroxy groups of polyesters or polyethers, which contain hydroxy groups, contained respectively in one of the two components, the basic varnish or the hardener or cross-linking agent. In general, the reaction takes place, with the use of unblocked polyisocyanates, under a continuous rise in viscosity at room temperature. The durability and processability of the blended varnish material is characterized by the so-called pot life which frequently is less than one hour. It is thus necessary, in the processing of such materials, to conduct the combining of the components in maximally close proximity to the processing apparatus, e.g. close to a spray gun, to avoid disturbances in the processing operation and losses of material.

A prerequisite for a flawless crosslinking action and thus for the quality of the varnish film (particularly, for example, hardness, luster, light stability, weatherability, and resistance to chemicals) is that the stoichiometric mixing ratio of the two components be maintained. The mixing ratio can be rather varied for various products, but is indicated by the manufacturer of the product in processing directives, including the tolerance range. The tolerance range is very narrow in individual products, so that exact metering must be carried out. Thus, the tolerance range of systems utilized in the automobile sector for repairing the enamel paint, for example, is $\pm 10\%$ of the hardener or cross-linking agent proportion with a mixing ratio of basic varnish/hardener or cross-linking agent of 2:1. It must be expected that in future systems the tolerance ranges, with altered mixing ratios, become even substantially more restricted.

When processing small amounts of two-component varnishes, the metering of the components is accomplished under practical conditions by liquid measure or weighing, and then the components are intermixed, for example by stirring, in relatively small storage containers. When processing large quantities of varnish, as, for example, in the series production painting of automobiles, different processing methods are necessary, in principle, ensuring a continuous operation of the paint supply, the combining of the component, the metering, and the mixing step, over longer periods of time.

It is, therefore, an object of this invention to propose a process by which large amounts of two-component varnishes can be processed continuously and wherein the mixture ratios are maintained constant within narrow limits in the existing framework of the operation over large periods of time.

This object has been attained by the invention by providing that, to intermix the components, the differently colored basic varnishes are withdrawn from different ring conduits and a colorless curing agent is withdrawn from a further ring conduit; and that the prescribed mixing ratio, which can be set by means of a metering element or device, is maintained by controlling the feed amount of at least one component of the two components, basic varnish or curing agent, to be fed to a color-changing block. For this purpose, the mixing ratio of the two components can be measured, after mixing in a mixing system, by means of a measuring system, the output measuring signal of which is a function of the mixing ratio, and the added amount of curing agent can be regulated by way of a control device with the aid of a controllable metering element, to have a predeterminable value. Furthermore, the entire flowthrough quantity of the component mixture can be measured and thereafter the added amount of hardener or cross-linking agent can be regulated.

Instead of regulating the curing agent, it is also possible to control one or several of the basic varnish components.

In view of the fact that basic varnishes or the hardener or cross-linking agent can vary already from the point where they are supplied, it is also possible to effect, even prior to measuring the mixing ratio, a measurement of the different basic varnishes or of the hardener or cross-linking agent, in each case individually.

Various parameters are suitable for measuring the component mixture or the hardener or cross-linking agent. Thus, the electric conductivity of the component mixture can be measured, for example, utilizing the thus-derived measured value for controlling the metering element. This measurement of electric conductivity can be accomplished by means of an alternating-current bridge which is balanced to zero with respect to the resistance of a conductivity measuring cell filled with the component mixture with the desired mixing ratio. The electric conductivity is proportional to the dielectric constant of the component mixture, namely $R = 1/\omega \cdot c \cdot \epsilon$.

In this connection, R is the a.c. resistance, $\omega$ is the angular frequency of the alternating current, c is the capacitance of the measuring arrangement, and $\epsilon$ is the dielectric constant, which thus can also be utilized for determining a measured value for controlling the metering element. For this purpose, the capacitance of a measuring capacitor in a Wheatstone bridge can be balanced to zero, this measuring capacitor being filled with the component mixture of the desired mixing ratio. The phase of the bridge output signal can be utilized, in this connection, relatively to the bridge input signal for deciding by measuring technology on the direction of the occurring deviations from the desired mixing ratio.

The invention will be explained in greater detail in the following description with reference to a mixing and measuring arrangement and the associated diagrams illustrated in the accompanying drawings, and further details of the process can be derived from this description, wherein.

Figure 3:
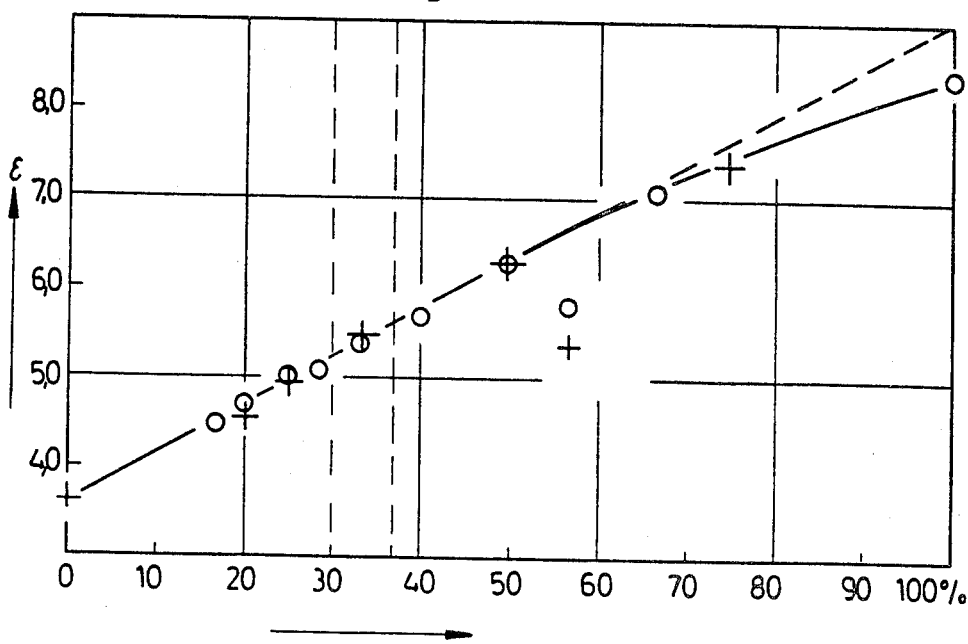
Figure 4:
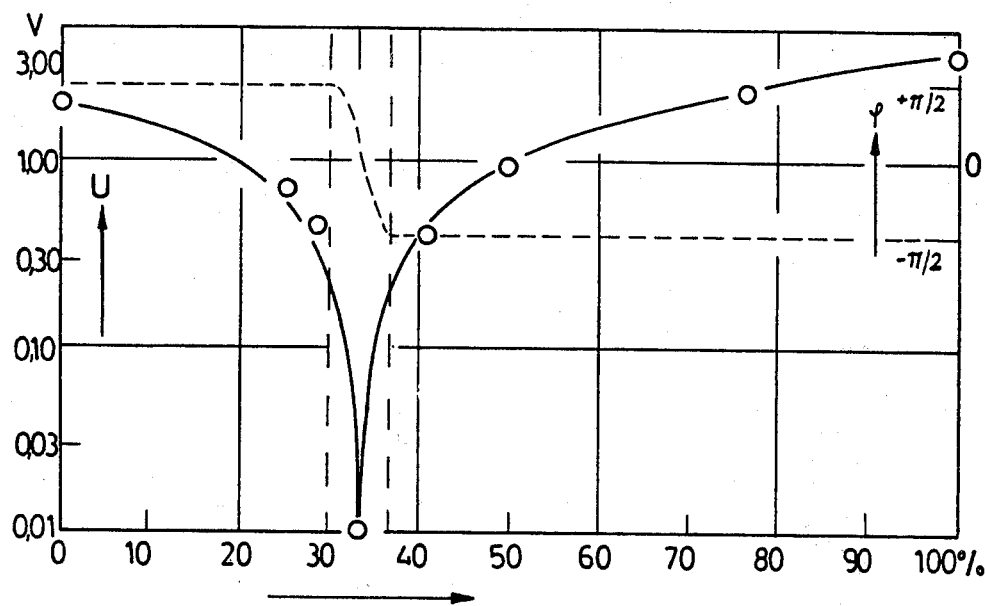

FIG. 3 is a graph showing the linear relationship between the dielectric constant and the proportion of hardener or cross-linking agent component contained within the two-component varnish or paint; and FIG. 4 is a graph illustrating the relationship between the bridge output circuit of an arrangement for measuring the dielectric constant $\epsilon$ over the range in which the hardener or cross-linking agent may be admixed with the mixture of the two-component varnish or paint.

Figure 1:
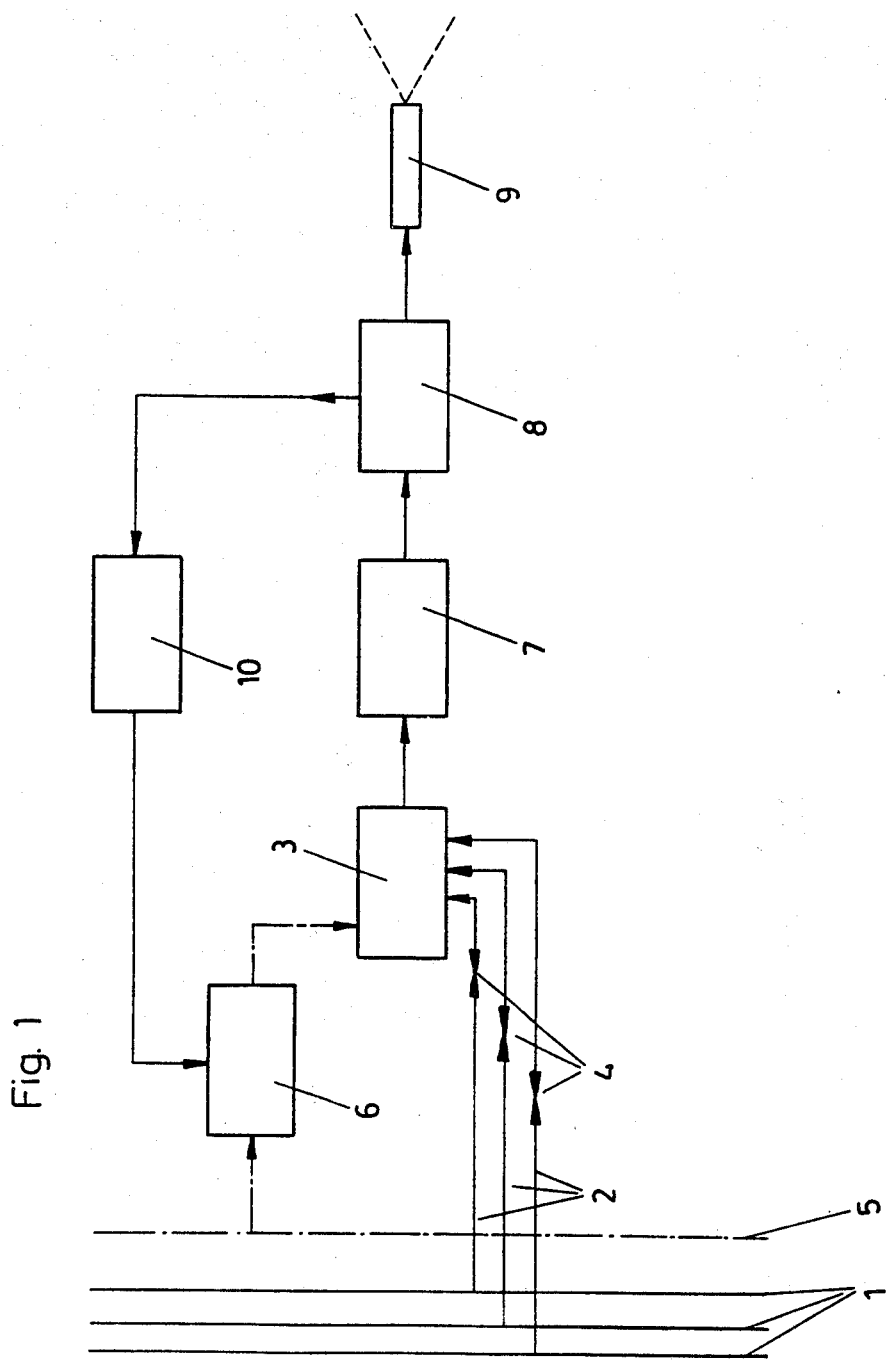
FIG. 1 is a block diagram of the process of the invention illustrating the sequence of operations utilized to mix and measure the two-component varnishes or paints of the invention prior to application.

According to FIG. 1, the process of this invention is carried out by feeding basic varnish to a conventional, commercially available color-changing block 3 from ring conduits 1, each of which conveys a varnish of a particular shade, via tap conduits 2. Reducing valves 4 in the tap conduits 2 make it possible to preselect an amount of throughflowing varnish in dependence on the color hue. This quantity can be adjusted in accordance with the required covering capacity of the layer thickness of a color hue. It is furthermore possible to feed hardener or cross-linking agent from a ring conduit 5 via a tap conduit by way of a metering element 6 to the color-changing block 3 wherein the basic varnish component is also present in the required dosage. Thereafter, the mixture of hardener or cross-linking agent and basic varnish is conveyed via any conventional mixing system 7 to a measuring system or means 8 prior to further processing; the measured quantity derived from this measuring system is a function of the mixing ratio of the two components, i.e. the varnish and hardener or cross-linking agent, and regulates, via a control unit 10, the controllable metering element 6 so that it provides a constant mixing ratio of both components, this ratio being preselectable at the measuring system 8. From the measuring system 8, the mixed varnish, which contains the hardener or cross-linking agent, is then conveyed to the site of application by way of the spray gun 9.

Starting with the fact that materials, which are different from one another, exhibit different, measurable data, and that the material data of mixtures represent functions of the mixing ratio of the starting components which can be determined by calculation or experiment, the invention executes a measurement of a specific material property of the mixture, for example, a measurement of the dielectric constant or a measurement of the electric conductivity in the measuring means 8, and utilizes such measurement for controlling the metering element 6 after determining the dependence of the measuring signal from the mixture ratio. A deviation from a specific value of the measuring signal, corresponding to the required mixing ratio, triggers the control operation in accordance with the invention, until the required value, which can be set at the measuring system, has been reached at the measuring site.

For effecting the measuring process according to the method described herein, all properties of a material can be utilized which render the components different from one another and which can be detected by a measuring technique and can be converted into a measuring signal suitable for controlling a metering element. In addition to measuring the specific electric conductivity or the dielectric constant or the dielectric loss factor, still other parameters can be measured. Depending on the type of the controllable metering element, it is possible to employ for its control, for example, electric, pneumatic, or hydraulic signals derived directly or indirectly from the measurement of the selected property of the material.

The process described herein can be varied, in principle, by basing the control procedure on the basic varnish rather than on the hardener or cross-linking agent, as discussed above. It is also possible to introduce additionally a control of the entire throughflow quantities.

Since furthermore basic varnishes or hardener or cross-linking agents can display properties of the material which are different, dependent on the manner in which they are fed, this aspect can also be taken into account and included into the control operation by means of an additional measuring instrument. Before combining the basic varnishes and the curing agent, these components can be measured individually, and the thus-measured data can be fed via a computer unit to the metering element 6 which also considers these data when metering the basic varnish or the hardener or cross-linking agent.

Figure 2:
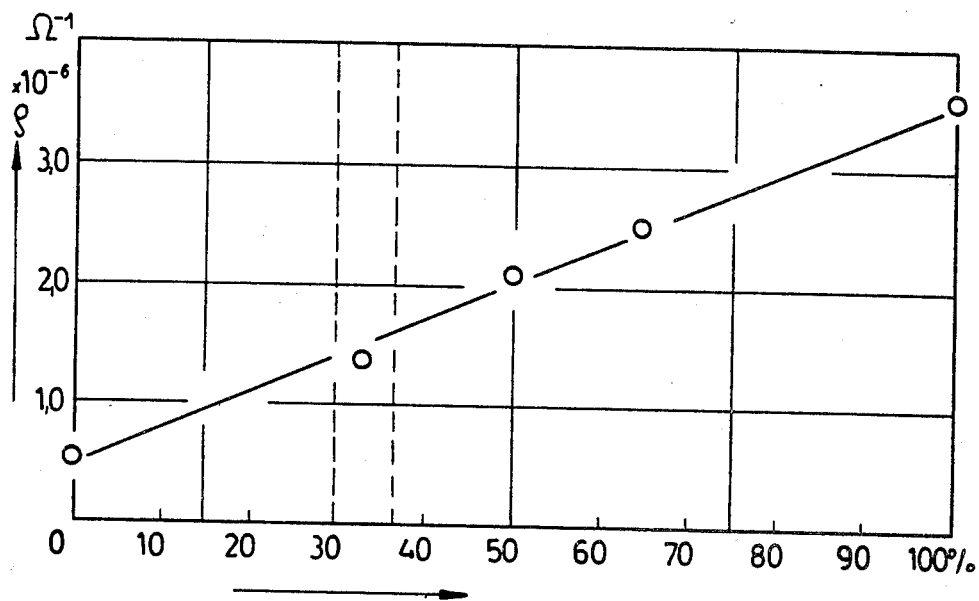
FIG. 2 is a graph showing the linear relationship between the electrical conductivity of the mixture of the two-component varnishes or paints and proportion of hardener or cross-linking agent in this mixture.

Measurable properties of the material useful for controlling the metering procedure are, in particular, the electric conductivity and the dielectric constant of the material mixture. FIGS. 2 and 3 show the adequately linear correlation between the electric conductivity $\rho$ and the dielectric constant $\epsilon$, determined by experiments, and the proportion of the hardener or cross-linking agent component in the mixture of materials.

All conventional methods for measuring the electric conductivity and the dielectric constant are suitable for the practical detection of the measuring variables by means of measuring devices, but especially advantageous are compensating methods according to the measuring bridge principle. The mixture of materials flows through a measuring cell connected into an alternating-current bridge along the lines of a Wheatstone bridge. The measuring cells employed are measuring cells for determining the conductivity or the dielectric constant and are of a conventional construction. The bridge can be tuned by making the bridge output signal equal to zero once the electric conductivity $\rho$ or the dielectric constant $\epsilon$ of the mixture of materials assumes the value corresponding to a certain, desired mixing ratio of the two components. A change in the mixing ratio results in a change in the electric conductivity $\rho$ or the dielectric constant $\epsilon$, and thus ensues a change of the bridge output signal which then becomes different from zero. The decision on the direction in which the change in mixing ratio is taking place can be detected, from the viewpoint of measuring technology, for example, by measuring the relative phase position of input signal and output signal, since this phase position is subject to a rotation by 180° with a suitable design of the bridge, in the range of the bridge compensation or tuning step.

For a two-component varnish, FIG. 4 shows an example in a diagram, plotting the bridge output signal of an arrangement for measuring the dielectric constant $\epsilon$ over the hardener or cross-linking agent proportion of the mixture. The processing directions require a mixing ratio of basic varnish to hardener or cross-linking agent of 2:1 with a tolerance of ±10% of the proportion of curing agent.

The output signal of the bridge, dependent on the mixing ratio of the two components, is present in the form of an electric voltage and is suitable directly or indirectly, after any desired conversion, for controlling a regulatable metering element of any desired kind.

What is claimed is:

1. A method for processing two-component varnishes of different color shades, said two-component varnishes containing a basic varnish liquid component and a hardener or cross-linking agent liquid component, said method comprising:
   (a) withdrawing at least one colored basic varnish liquid component from at least one of a plurality of ring conduits carrying different-colored basic varnishes;
   (b) feeding said basic varnish component to a colored-changing block;
   (c) withdrawing, through controllable measuring means, a colorless hardener or cross-linking agent liquid component from another ring conduit in a predetermined and previously adjusted mixing ratio with respect to said basic varnish component, said ratio being set by said controllable metering means and maintained by controlling the feed quantity of at least one of said components;
   (d) feeding said hardener or cross-linking agent component to said color-changing block wherein the basic varnish component and the hardener or cross-linking agent component are initially admixed;
   (e) thoroughly mixing said components;
   (f) measuring the dielectric constant of said thoroughly mixed components to generate a signal which is a function of the mixing ratio; and
   (g) using said signal to control said metering means to maintain the predetermined mixing ratio.

2. A method according to claim 1 wherein the generated measuring signal which is a function of the mixing ratio is fed to a control unit connected to the metering means and the amount of hardener or cross-linking agent added is regulated by said metering means to be at a presettable value to maintain said predetermined mixing ratio.

3. A method according to claim 1, wherein the dielectric constant of the entire throughflow quantity of the component mixture is measured and thereafter the amount of hardener or cross-linking agent to be added is regulated.

4. A method according to claim 2, wherein the dielectric constant of the entire throughflow quantity of the component mixture is measured and thereafter the amount of hardener or cross-linking agent to be added is regulated.

5. A method according to claim 2, wherein the dielectric constant of the mixture of the two components after being thoroughly mixed is measured to produce the measuring signal which is a function of the dielectric constant and the concentration of the hardener or cross-linking agent, the dielectric constant of the mixture exhibiting a linear relationship with the proportion of hardener or cross-linking agent contained within the mixture.

6. A method according to claim 1, wherein the mixture of varnish and hardener or cross-linking agent after being thoroughly mixed, is immediately applied onto a surface to be coated with said mixture.

7. A method according to claim 1, wherein the dielectric constant of said thoroughly mixed components is measured to generate a signal to provide a mixing ratio of basic varnish component to hardener or cross-linking agent component of 2:1 with a tolerance of ±10% of the proportion of the hardener or cross-linking agent component.

* * * * *